United States Patent [19]

Kalwar et al.

[11] Patent Number: 4,467,200

[45] Date of Patent: Aug. 21, 1984

[54] DEVICE FOR THE SURFACE TREATMENT OF THERMOPLASTIC MOLDINGS BY CORONA DISCHARGE

[75] Inventors: Klaus Kalwar, Alte Landwehr 10, 4803 Steinhagen-Amshausen; Egon Freytag, Halle-Kunsebeck; Lothar Hirschinger, Mannheim; Klaus Ebner, Aglasterhausen, all of Fed. Rep. of Germany

[73] Assignees: Klaus Kalwar, Steinhagen-Amshausen; Firma Carl Freudenberg, Weinheim, both of Fed. Rep. of Germany

[21] Appl. No.: 320,708

[22] Filed: Nov. 12, 1981

[30] Foreign Application Priority Data

Dec. 1, 1980 [DE] Fed. Rep. of Germany ....... 3045259

[51] Int. Cl.³ ............................................. H01T 19/04
[52] U.S. Cl. .................................................. 250/324
[58] Field of Search ................................. 250/325, 324

[56] References Cited

U.S. PATENT DOCUMENTS

| 3,146,385 | 8/1964 | Carlson | 250/325 |
|---|---|---|---|
| 3,183,352 | 5/1965 | Brandt et al. | 250/324 |
| 3,254,215 | 5/1966 | Oliphant | 250/325 |
| 3,655,966 | 4/1972 | Takimoto et al. | 250/324 |
| 3,743,830 | 7/1973 | Takahashi et al. | 250/325 |
| 3,800,153 | 3/1974 | Matsumoto et al. | 250/325 |
| 3,935,517 | 1/1976 | O'Brien | 250/325 X |

Primary Examiner—Alfred E. Smith
Assistant Examiner—Jack I. Berman
Attorney, Agent, or Firm—Kenyon & Kenyon

[57] ABSTRACT

An electric discharge corona discharge device is disclosed which is useful for rendering of the surface of plastic molded parts capable of being adhesively bound to another part. The device includes flexible, limp counter electrodes which can be adjusted so as to maintain a substantially uniform discharge over the plastic part surface. The discharge is obtained with alternating current and the base underneath the plastic part constitutes the base electrode.

12 Claims, 9 Drawing Figures

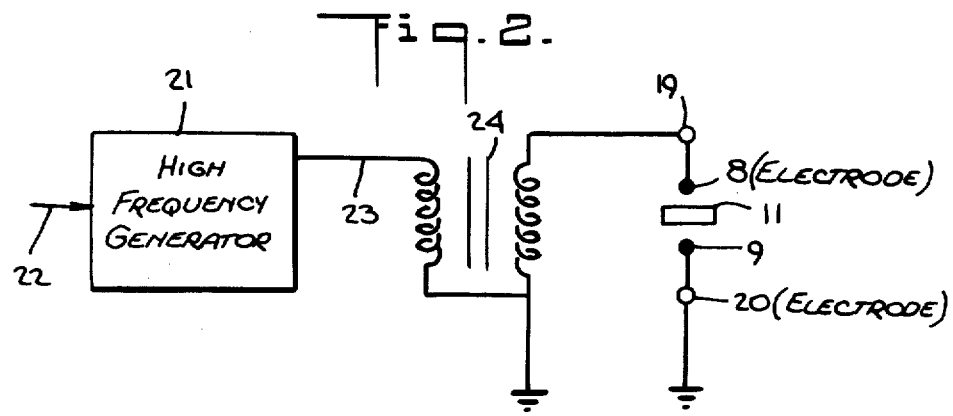
Fig. 2.
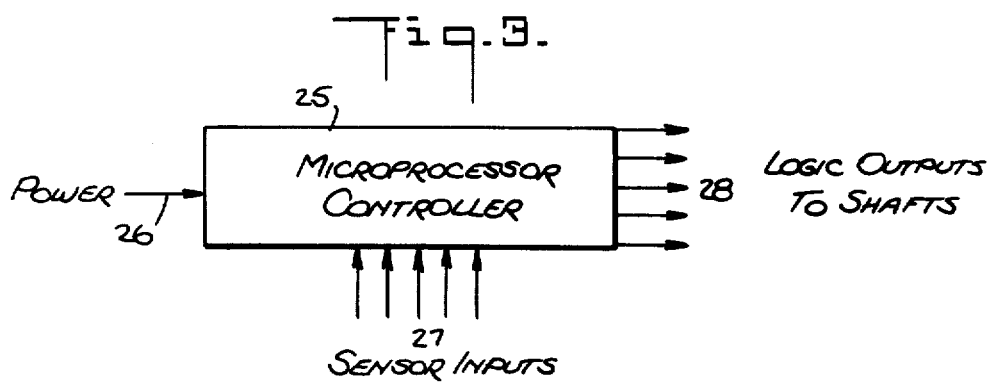
Fig. 3.
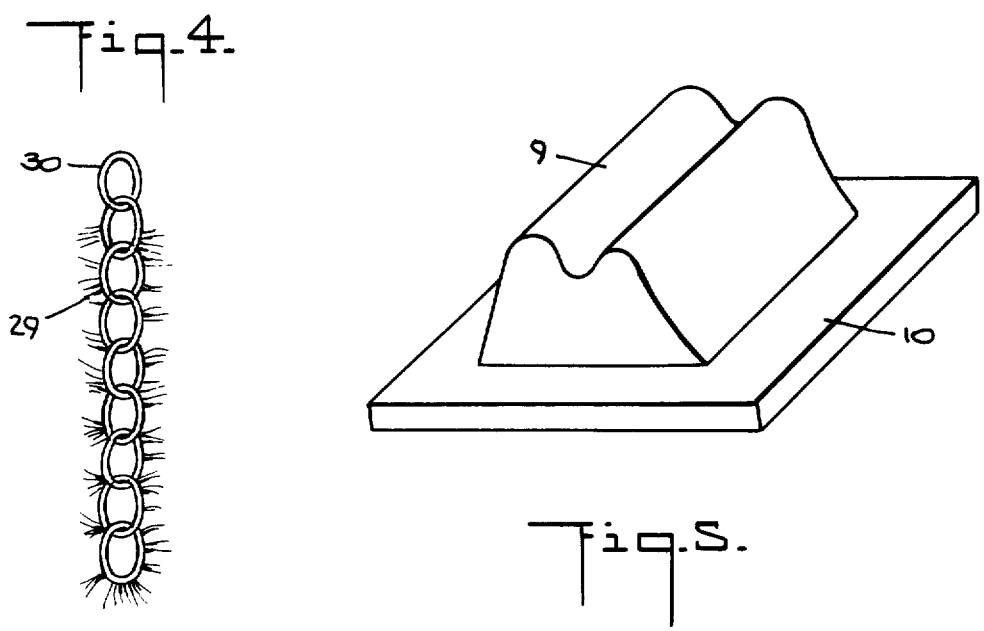
Fig. 4.
Fig. 5.

DEVICE FOR THE SURFACE TREATMENT OF THERMOPLASTIC MOLDINGS BY CORONA DISCHARGE

BACKGROUND OF THE INVENTION

The invention relates to a device for the corona discharge treatment of the surfaces of irregularly shaped thermoplastic moldings, in which the molded parts are affixed to a movable base electrode and moved past a counterelectrode.

Some plastics, such as polyolefins like polyethylene or polypropylene have properties which make good surface adhesion of coating substances very difficult. This is extremely disadvantageous when moldings of complicated shape, such as are used in the automotive industry, are to be processed with surface adhering materials like paints, adhesives and the like. Moreover, permanent combination of the moldings with other materials to form composites is also difficult.

Several methods for the alteration of the surface properties of such plastics are known. These include roughening action, use of chemicals having an oxidizing effect, and a glow or arc discharge as well as corona discharge which act to improve the adhesion properties of the plastic. In general, electrical treatment requires maintenance of a nearly uniform distance between the discharge electrode and the plastic surface. Otherwise, variation of the quality of coating adhesion is produced.

An example of electric discharge processing is described in German Design Patent No. 17 43 687. In this process, an electric discharge from brush electrodes is used to alter the surface properties of plastic webs as the webs travel between the electrodes. Insulators are disposed at the free ends of the electrodes to inhibit or prevent sparkover along the region of electrode sections extending beyond the width of the webs. This arrangement, however, only permits treatment of plastics in web form.

Another device for the electric corona processing of plastic parts of complicated shape is described in DE AS 12 32 333. In this process, plastic tube surfaces are altered by an electrode exposure process which maintains as constant as possible surface-electrode distance. To accomplish this, the tube is positioned on an inner electrode adapted to the shape of the tube interior. The tube and inner electrode are then placed into a form fitting cavity of an outer electrode which has the shape of the outer surface of the tube. The inner surfaces of the outer electrode cavity are disposed at a constant distance from the tube surfaces. Thus, considerable progress in the treatment of parts of complicated shape has been made and high quality control mass production of large numbers of tubes is possible.

The method described in DE AS No. 12 32 333, however, presents difficult problems when it is used to produce irregularly shaped moldings such as those of the automotive industry. In these applications, the molding, e.g., a dashboard, would have to be put on a base electrode fitting the contour of the molding, and a counterelectrode matching its shape and completely enveloping it would have to be provided. Such a procedure is not only costly, impractical and unreasonable, but also will not work for the mass production of differently shaped parts because of the great number of base and counterelectrodes needed and the rapid interchange of the different parts on the production line.

Therefore, it is an object of the invention to develop a device which needs little maintenance, works economically and permits, without complications, corona processing of the surface of plastic parts of very complicated shape for the automotive industry, even in mass production. A further object is that the device be applicable to plastics like polyolefins, e.g., polyethylene and polypropylene.

SUMMARY OF THE INVENTION

These and other objects are achieved by the invention which is directed to an electric corona discharge device which can be used to alter the surface properties of plastic parts or moldings of even the most irregular shapes. The device retains the molding on a movable base electrode and moves it past a counterelectrode with the distances between substantially all points of the molding and counterelectrode being held as uniform as possible. The device comprises a base electrode, which is a retaining electrode at least in part adapted to the inner shape of the molding, but smaller in cross-section, and a counterelectrode for creation of the electric discharge. The counterelectrode comprises a plurality of flexible discharge units movably and/or detachably mounted in a holder which are adaptable to the contours of the molding. The base electrode is disposed on a movable and pivoted carrier and the counterelectrode discharge units are height-adjustable, pivotable and rotatable. The flexible discharge units can be adjusted so that they touch the molding as it passes underneath or their ends proximate to the molding can be adjusted so that the gap distances between the proximate ends and the molding surface are substantially uniform. With either arrangement, the proximate ends of the units may describe the outline of the molding, however, this is not essential when the units touch the molding. The maximum gap distance between the molding and proximate ends of the units in the second arrangement will be determined by the voltage available which at that distance will produce a good corona effect and substantially uniform surface alteration of the plastic.

The electric corona discharge is obtained by the discharge of alternating current potential between the two electrodes, the base electrode preferably being provided with a dielectric. Use of a dielectric as an insulating material will assure a surface-covering discharge.

BRIEF DESCRIPTION OF THE DRAWINGS

The drawings show several embodiments of the invention as well as counterelectrode details.

FIG. 2 is a schematic of the high power electricity generation system.

FIG. 3 is a schematic of a unit for sensing the effects of the drives.

FIG. 4 shows a view of the corona discharge from a flexible discharge unit of a counterelectrode.

FIG. 5 shows an example of a base electrode.

DETAILED DESCRIPTION OF THE INVENTION

Figure 1:
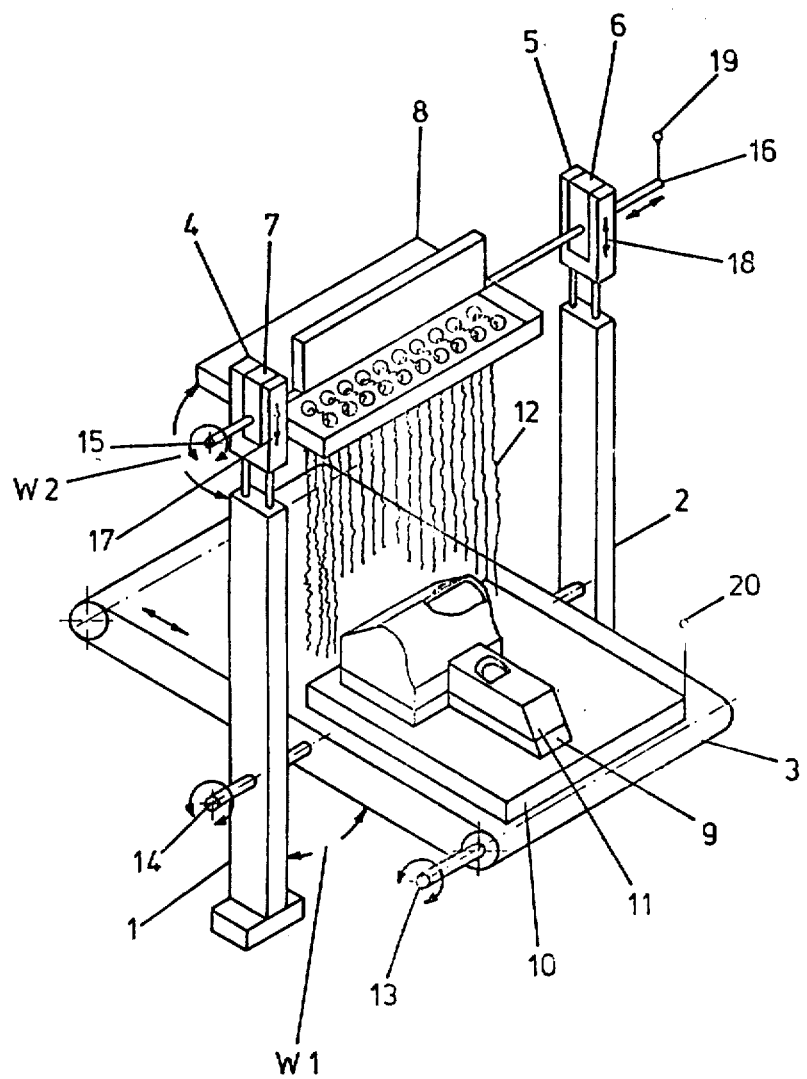
FIG. 1 is a perspective view of the device according to the invention.

Alteration of the surface of the plastic molded parts is necessary in order to make the surface adhesive or otherwise amenable to the subsequent processing steps for the parts. When employing electric discharge techniques, the surface of the molding to be altered must pass the electrode at a distance as uniform as possible, that is, the electrode-molding surface gap distance must be approximately similar at all points. Angular sections and corners must also be exposed to the electrode discharge with approximately similar gap distances. Maintaining a substantially uniform gap distance is necessary in order to produce substantially uniform alteration of the plastic surface and consequent substantially uniform adhesive or binding properties. Otherwise, the coating, laminate or other material to be applied to the plastic surface will bubble, buckle or otherwise not be bound tightly at all points.

The device according to the invention permits substantially uniform molding surface alteration and is especially able to alter the surfaces in relatively inaccessible areas such as corners, depressions or the like because the flexible discharge units are adaptable to the contours of the molding. The base electrode is movably mounted, e.g., on a revolving conveyor belt, transport pallets and the like, and at least partially fills the inside shape of the part being treated. This arrangement allows processing a series of differently shaped moldings on one conveyor belt and in one operation. The device provides for varying dimensions of the moldings and has wide tolerances for processing in order to permit efficient production methods. It is no longer necessary to produce an electrode system which matches the geometry of the molding because the electrode system of the invention is adaptable to a wide variety of different shapes.

The flexible discharge units can be adjusted to provide two-dimensional outlines of different shape in accordance with the particular molding application, and they have the additional advantage of automatic machine operated orientation in relation to the molding. Corona discharge sensors are placed within the base electrodes at several points and are also connected to the drives. The discharge should be substantially uniform in order to produce substantially uniform molding surface alteration and the sensors will detect variations in the discharge which can be transmitted to a microprocessing controller. The controller will then adjust the height, width, angular orientation and discharge unit length of the counterelectrode as well as the speed and orientation of the base electrode by activating servos for controlling these parameters. In this manner, the discharge intensity will be kept at a fairly uniform level at all points on the molding.

The flexible counterelectrode discharge units may be of any form which permits individual movement of each unit. Typically, they are movably mounted on a holder which permits their individual adjustment. Preferred are metallic chains, strings, springs, or brushes. The molding to be treated is placed on the base electrode and then moved through the adaptable counterelectrode. During processing under the counterelectrode, the base electrode with the molding can perform relative axial or radial motions. The counterelectrode is height-adjustable and pivotable so that readjustment which conforms to the contours of the molding is possible. When using brushes as discharge units, it is preferred that the brushes be rotatably mounted. This achieves a surface-covering corona treatment in the critical corners of the molding.

The use of chains as flexible discharge units has proved practical for the manufacture of moldings for the automotive industry, such as dashboards, tunnel covers, side panels, valves and tubing made of or surface-coated with plastics. It is a peculiarity of an electric corona discharge that it develops especially at the ends and corners of conductive parts when a high voltage of high frequency is applied. In a chain, these effects occur practically at every link, which induces a multiple discharge and yields particularly good surface alteration results.

When multiple flexible limp discharge units such as chains or strings are used, they may be fitted through the perforations in a perforated sheet of metal. The sheet may then be connected to the power source to provide the voltage for discharge at the individual electrodes. A cover clamping means such as a solid plate, which can be clamped over the units and sheet, can also be utilized to hold the units at a fixed distance and prevent their accidental lengthening or shortening.

The various features of the invention are further exemplified by the embodiments depicted in the figures. The following description particularly points out these features of the figures.

FIG. 1 shows an overall perspective design of an embodiment of a device of the invention. As shown in the Figure, conveyor belt 3 is mounted between uprights 1 and 2. Electrode supports 4 and 5 with the electrode holders 6 and 7 which carry counterelectrode 8 are also mounted on uprights 1 and 2. Positioned on the conveyor belt 3 and on top of retaining and orientation plate 10 is base electrode 9. Molded part 11, being subjected to the corona treatment, is disposed on base electrode 9. Flexible discharge units 12, here shown in the form of chains, are fastened in counterelectrode 8. The chains are preferably of different lengths in order to enable optimum adaptation to the outline of molded part 11.

Conveyor belt 3 is driven by shaft 13. It can be moved along angle W 1 by means of shaft 14. This makes it possible for flexible discharge units 12 to reach critical edges and corners of molded part 11. The arrangement for pivoting the counterelectrode 8 by the angle W 2 by means of the shaft 15 is comparable. It is possible in addition, by means of the shaft 16, to move counterelectrode 8 relative to the travel direction of the conveyor belt 3 by a 90° angle. It is further possible, by means of shafts 17 and 18, to adjust the height of counterelectrode 8 relative to base electrode 9. Counterelectrode 8 is connected by terminal 19, and base electrode 9 by terminal 20 to a high voltage of high frequency, and when molded part 11 is moved past flexible discharge carriers 12, an electric corona discharge is produced on them, whereby the desired alteration of the adhesion properties of the surface of molded part 11 is obtained.

FIG. 2 illustrates the schematic for the electric discharge system. Line voltage and frequency electricity is fed to generator 21 by conductor 22. Generator 21 transforms the electricity to a high frequency level and feeds it to an output transformer 24 by conductor 23. Transformation of the electricity to a high voltage, which is then applied to electrodes 8 and 9 by terminals 19 and 20, takes place in the output transformer 24.

FIG. 3 shows the principle of a microprocessing controller. As may be seen from FIG. 1, the device has various drives which can be operated as required in conformity with the shape of molded part 11. The corona discharge effects are picked up by suitable sensors in the vicinity of part 11 and the device drives; the resulting sensor signals are then processed in microprocessor 25. Control unit 25 is powered by an appropriate power source which is connected to the controller by conductor 26. The sensor outputs from shafts 13, 14, 15, 16, 17 and 18 and from part 11 are supplied to the controller 25 by conduit lines 27; and the shafts are logically controlled by the conduit lines 28.

FIG. 4 shows a particularly favorable example of discharge carrier 12. This embodiment is chain 30 illustrated with corona discharge 29 which is produced by applying high frequency, high voltage electricity.

FIG. 5 shows base electrode 9 which usually consists of cast or molded material, such as thermoplastic or thermosetting plastic material with additives to affect the electrical conductivity. The electrode 9 is rigidly mounted to a baseplate 10. Both may be disposed on the conveyor belt 3.

Figure 6:
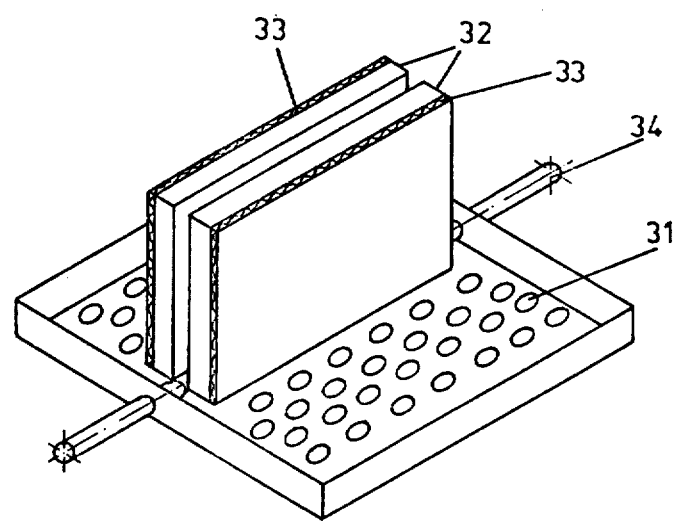
FIG. 6 illustrates details of an embodiment of a counterelectrode.

FIG. 6 shows in greater detail the counterelectrode 8 as part of the overall device. A sheet of perforated metal is shaped so as to be at least as large as the overall dimensions of molded part 11. Discharge units 12, e.g., in the form of chains or strings, can readily be suspended from perforations 31 and their individual lengths adapted to molding 11. The electrode has two covers 32, coated on their undersides with elastic material 33. This makes it possible to lock the suspended chains by clamping them in perforations 31 when covers 32 are shut. The shaft 34 is designed so as to make the electrode readily exchangeable.

Figure 7:
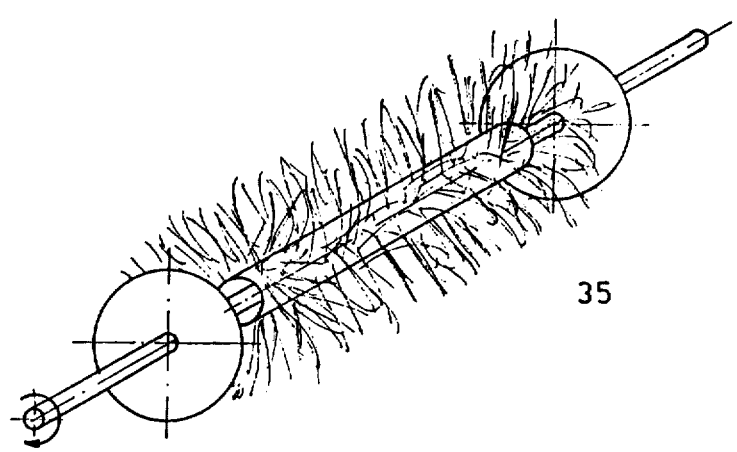
FIG. 7 shows another embodiment example of the counterelectrode.

FIG. 7 shows another example of a counterelectrode 8. It consists of metallic brushes 35 mounted on shaft 34. The discharge takes place at the brush. In operation, it is advisable to cause the electrode to rotate.

Figure 8:
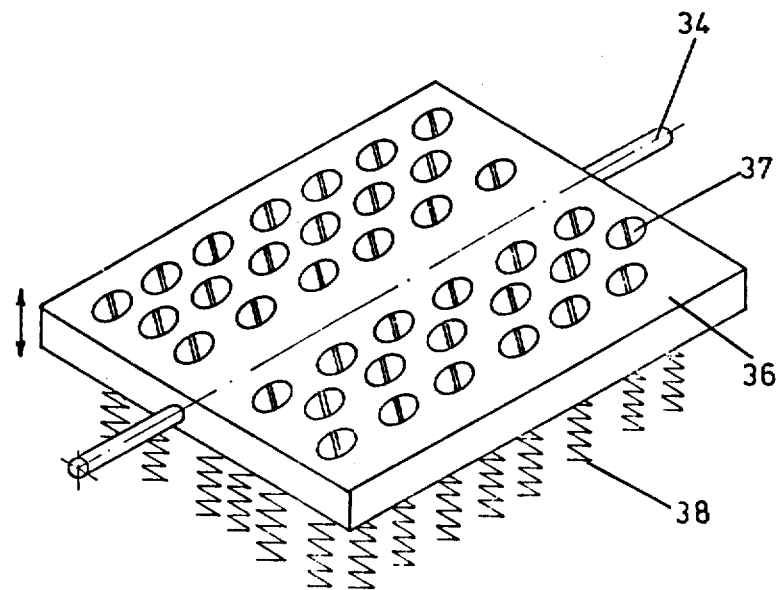
FIG. 8 shows yet another embodiment example of the counterelectrode.

FIG. 8 shows another possibility for counterelectrode 8. Mounted on the shaft 34 is plate assembly 36 containing screws 37, to the ends of which springs 38 are fastened. When the electrode moves in the vertical direction and the springs exert pressure on the molding 11 to be treated, the desired electric discharges will occur at the ends and edges of springs 38.

Figure 9:
FIG. 9 shows a setscrew suited to regulate the discharge units.

FIG. 9 shows the detail of setscrew 37 of FIG. 8 to which a compression spring is fastened.

We claim:

1. An alternating current corona discharge device for altering the surface properties of a plastic molding so that the surface is rendered bondable, which comprises:
a movable, pivotable base electrode upon which the molding is positioned, said base electrode being at least partially adapted to the inside shape of the molding but being smaller in cross-section; and
a corresponding height adjustable and pivotable counterelectrode comprising a plurality of flexible, limp corona discharge units which do not exert a counter-force when flexed from their unflexed positions, are movably mounted in a holder, and are adaptable to the outline contours of the molding.

2. A device according to claim 1 wherein the base electrode is coated with a dielectric.

3. A device according to claim 1 wherein the corona discharge units are of a suitable geometric shape to form a spread-shaped corona discharge and at least their ends are proximate to the surface of the molding.

4. A device according to claim 1 wherein the corona discharge units are metallic chains.

5. A device according to claim 1 wherein the lengths of the corona discharge units differ from one to the other and are adapted to the two-dimensional outline of the surface of the molding.

6. A device according to claim 1 wherein the counterelectrode is a sheet of perforated metal with discharge units movably positioned in the perforations and a cover clamping means fitting over the sheet, the dimensions of the sheet being at least as large as the overall molding dimensions.

7. A device according to claim 6 wherein the discharge units are movably attached to a sheet of perforated metal so as to be adjustable by means of setscrews.

8. A device according to claim 1 wherein the ends of the units proximate to the molding touch the molding.

9. A device according to claim 1 wherein the ends of the units proximate to the molding are positioned at a substantially uniform gap distance from the molding surface.

10. A device according to claim 10 wherein the gap distance is determined by a combination of the corona voltage and production of a substantially uniform surface alteration of the molding.

11. A device according to claim 1 wherein said base electrode contains corona discharge sensors; said base electrode, said counter electrode and said units are each connected to mechanical drive means for adjustment of base electrode movement and angular orientation, counter electrode height, width and angular orientation and individual discharge unit length; and said sensors are electrically connected to said drive means through a microprocessor adapted to activate said drive means when said sensors detect variations in the corona discharge emanating from individual units such that the corona discharge remains substantially uniform at substantially all points on the molding.

12. A device according to claim 1 wherein the discharge units are metallic strings.

* * * * *

UNITED STATES PATENT AND TRADEMARK OFFICE
CERTIFICATE OF CORRECTION

PATENT NO. : 4 467 200
DATED : August 21, 1984
INVENTOR(S) : Klaus Kalwar et al

It is certified that error appears in the above—identified patent and that said Letters Patent is hereby corrected as shown below:

In column 6, line 37, claim 10, change "...according to claim 10..." to read --...according to claim 9 ...--

Signed and Sealed this

Twelfth Day of March 1985

[SEAL]

Attest:

DONALD J. QUIGG

*Attesting Officer*  *Acting Commissioner of Patents and Trademarks*